(12) United States Patent
Howard et al.

(10) Patent No.: US 7,146,327 B1
(45) Date of Patent: Dec. 5, 2006

(54) ELECTRONIC PUBLICATION DISTRIBUTION METHOD AND SYSTEM

(75) Inventors: Dale S. Howard, Clive, IA (US); L. Joy Griebenow, Plano, TX (US); Kim Lenger, Knoxville, IA (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 08/673,986

(22) Filed: Jul. 1, 1996

(51) Int. Cl.
*G06F 1/00* (2006.01)

(52) U.S. Cl. ....................................................... 705/14
(58) Field of Classification Search .................. 705/14, 705/26; 707/4, 104; 395/200.47, 613, 200.9, 395/200.61; 709/219
See application file for complete search history.

(56) References Cited

U.S. PATENT DOCUMENTS

| | | | | |
|---|---|---|---|---|
| 5,050,213 A | * | 9/1991 | Shear | 380/25 |
| 5,125,075 A | | 6/1992 | Goodale et al. | 395/200.3 |
| 5,283,856 A | | 2/1994 | Gross et al. | 395/51 |
| 5,305,195 A | * | 4/1994 | Murphy | 364/401 |
| 5,341,474 A | * | 8/1994 | Elman et al. | 395/200 |
| 5,367,561 A | * | 11/1994 | Adler et al. | 379/91.01 |
| 5,371,532 A | * | 12/1994 | Elman et al. | 348/7 |
| 5,410,598 A | * | 4/1995 | Shear | 380/4 |
| 5,442,771 A | * | 8/1995 | Filepp et al. | 395/650 |
| 5,461,667 A | * | 10/1995 | Remillard | 379/93.24 |
| 5,508,817 A | | 4/1996 | Kunigami | 358/402 |
| 5,561,709 A | * | 10/1996 | Remillard | 379/93.19 |
| 5,612,897 A | * | 3/1997 | Rege | 364/514 |
| 5,617,565 A | * | 4/1997 | Augenbraun et al. | 707/4 |
| 5,625,818 A | * | 4/1997 | Zarmer et al. | 707/104 |
| 5,649,186 A | | 7/1997 | Ferguson | 395/610 |
| 5,694,546 A | * | 12/1997 | Reisman | 705/26 |
| 5,699,528 A | | 12/1997 | Hogan | 395/240 |

(Continued)

FOREIGN PATENT DOCUMENTS

| | | | |
|---|---|---|---|
| JP | 407239828 | * | 9/1995 |
| JP | 407325836 | * | 12/1995 |

OTHER PUBLICATIONS

"Comtex Wins E–Mail Agreement With Newnet"; Newsbytes News Network; Dialog, File: 15, Accession# 04217013, Dec. 1992.*

(Continued)

*Primary Examiner*—Romain Jeanty
(74) *Attorney, Agent, or Firm*—Baker Botts L.L.P.

(57) ABSTRACT

A method and system for distributing an electronic publication allows the distribution of customized publications, including customized advertising, customized content, or both. In accordance with the method for distributing an electronic publication, an electronic publication is retrieved from storage. The electronic publication is delivered to the consumer by electronically sending the electronic publication to the consumer's electronic mail address.

In accordance with another aspect of the invention, the electronic publication may include customized advertising. A consumer profile associated with the consumer is stored in a database and comprises a plurality of profile data items. A database of content items and advertising items is created, including at least some targeted advertising items. Each targeted advertising is associated with an inclusion criterion wherein a decision as to whether the inclusion criterion for a particular advertisement has been met depends upon the value of one or more profile data items. The electronic publication is created and comprises some content items and at least one targeted advertising item. The targeted advertising item is included because the inclusion criterion for that targeted advertising item has been met.

2 Claims, 4 Drawing Sheets

U.S. PATENT DOCUMENTS

| | | | | |
|---|---|---|---|---|
| 5,710,884 A | * | 1/1998 | Dedrick | 395/200.47 |
| 5,717,923 A | * | 2/1998 | Dedrick | 395/613 |
| 5,740,549 A | * | 4/1998 | Reilly et al. | 705/14 |
| 5,760,549 A | * | 6/1998 | Kobayashi | 315/382 |
| 5,845,281 A | * | 12/1998 | Benson et al. | 707/9 |
| 5,848,397 A | * | 12/1998 | Marsh et al. | 705/14 |
| 5,855,008 A | * | 12/1998 | Goldhaber et al. | 705/14 |
| 5,892,900 A | * | 4/1999 | Ginter et al. | 713/200 |
| 5,917,040 A | * | 6/1999 | Markovac et al. | 705/14 |
| 5,983,005 A | * | 11/1999 | Monteiro et al. | 709/213 |
| 5,995,943 A | * | 11/1999 | Bull et al. | 705/14 |
| 6,708,157 B1 | * | 3/2004 | Stefik et al. | 705/59 |

OTHER PUBLICATIONS

Metcalfe; Get ready for personalized newspapers; InfoWorld, v15, n14, p52(1); Dialog, File: 148, Accession# 06428564, Apr. 1993.*

Metcalfe; "Get ready for personalized. (From the Ether)"; Infoworld, v15, n14, p52(1); Dialog, File: 148, Accession# 06428564, Apr. 1993.*

Lamar; "Telecommunications: The best of times, the worst of times"; Executive Speeches v8n5 pp 34–37; Dialog, File: 15, Accession# 00875607, May 1994.*

Sharkansky; "Unleashing your magazine on the Internet"; Folio: The Magazine for Magazine Management v24n3 pp: 61; Dialog, File: 15, Accession# 00971753, Feb. 1995.*

"First In An Exclusive EMR Series"; Electronic Marketplace Report, v9, n10; Dialog, File 636, Accession# 02732910, May 1995.*

"Network World: NW Fusion partners with Focalink to offer value–added online advertising options"; M2 Presswire; Dialog, File 636, Accession# 03144817, Jun. 1996.*

"How to Focus A sales Pitch In Cyberspace"; New York Times p. c1; Dialog, File: 16, Accession# 06030461, Mar. 1996.*

"E! TV, C/NET Form Online Company"; BRP Publications, vol: 3 issue: 20; Dialog, File 696, Accession# 00056118, Jan. 1996.*

Beth; "Scorching on the web"; Direct, v7, n10, p73(1); Dialog, File: 148, Accession# 08258128, Oct. 1995.*

Elliot, "How to Focus a Sales Pitch In Cyberspace"; The New York Times; Section D, p. 1; col. 5, Mar. 1996.*

Bocker et al. "IPSI'S experimental multimedia products"; EC2, Nanterre, France, p. 485–486, Dialog, File: 2, Accession# 04292351, Dec. 1992.*

Jon; "Newspapers get personal—And portable"; Editor & Publisher v127n7; Dialog, File 15, Accession# 00823115, Feb. 1994.*

"Adaptive technology for the disabled"; Human resource management, Mar. 1993.*

"The List serv Server"; Earn Association, Jan. 1993.*

David Everything you ever wanted to know about Latin America (and more). (Latin America Base); Feb. 1994, Link–up, v11, n1, p. 10(2); Dialog file 148, Accession No. 07228781.*

Daid (On–line cruisers advice agents on how to embrace 'the Net.' (includes article on Internet terminology), Jan. 1995, Travel weekly, v54, n2 p. 36(2), Dialog file 148, Accession No. 07663399.*

Dialog "Data Access Corporation Now Shipping OfficeWorks Group Productivity Software"; Jun. 1988; New Release; pp. 1–2; Dialog file 621, Accession No. 01077416.*

* cited by examiner

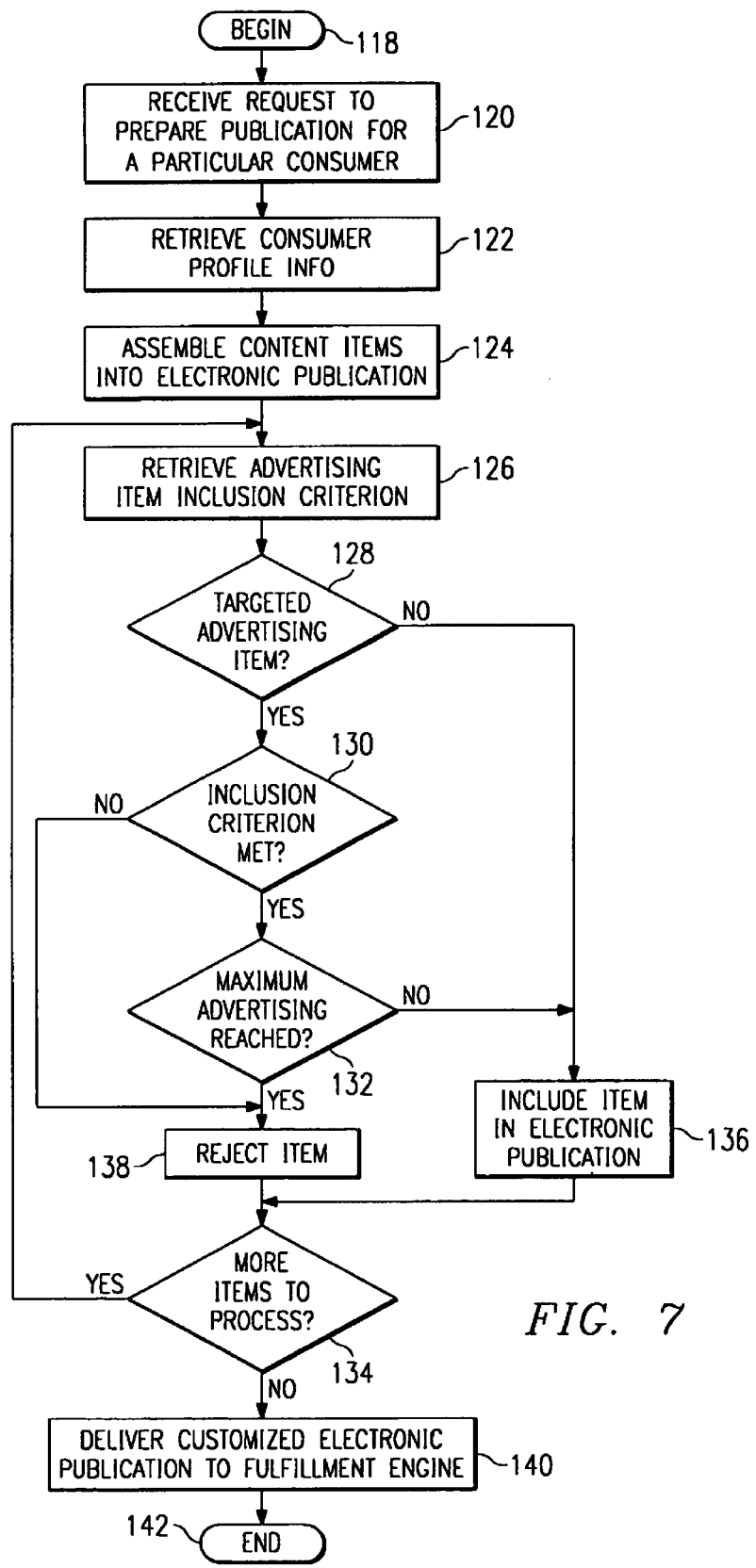

ELECTRONIC PUBLICATION DISTRIBUTION METHOD AND SYSTEM

CROSS-REFERENCE TO RELATED APPLICATION

This application is related to U.S. application Ser. No. 08/673,988, filed on Jul. 1, 1996 by L. Joy Griebenow, et. al. and entitled "Method and System For Electronic Publication Distribution Including Return Receipt," pending.

TECHNICAL FIELD OF THE INVENTION

This invention relates generally to electronic publications and more particularly to a method and system for distributing electronic publications using a computer network, wherein the publications may include customized advertising.

BACKGROUND OF THE INVENTION

As the use of the Internet and dial-up computer services have increased, publishers have begun to seek new ways to sell their published works. Various publishers have started creating on-line versions of their magazines that are available through a dial-up service such as America Online. To read one of these on-line magazines, a consumer typically signs on to the dial-up service and reads the magazine while connected to the service.

These on-line magazines, however, have disadvantages. A consumer that is on-line reading an online magazine has to pay for the time that he is on-line. These time charges can cause an electronic magazine to exceed the newsstand price of that magazine. Most interactive versions of magazines also do not carry advertisements. Without advertisements, the publisher of the magazine loses a potential source of revenue and advertisers are cut off from consumers. Also, many consumers utilizing dial-up services only have a single phone line, so reading the on-line magazine ties up the consumer's phone line. Accessing on-line magazines may also be inconvenient as a consumer may have to proceed through a number of steps required by the on-line service each time he desires to read the on-line magazine.

SUMMARY OF THE INVENTION

The invention comprises a method and system for distributing an electronic publication. The invention further comprises customizing the electronic publication and including customized advertising targeted at a particular consumer. In accordance with the method of distributing the electronic publication, an electronic publication is retrieved from storage. The electronic publication is delivered to the consumer by electronically sending it to the consumer's electronic mail address.

The electronic publication may also be customized. In accordance with the invention, advertising in the electronic publication may be customized by storing a consumer profile in a database associated with a particular consumer and including a number of profile data items. A database of content items and advertising items is created for possible inclusion in the electronic publication. At least some of the advertising items are targeted advertising items. Each of the targeted advertising items has an inclusion criterion that may be met or unmet depending upon the value of one or more profile data items. The electronic publication is created for the consumer in a customized manner and contains at least some of the content items and at least one targeted advertising item where the inclusion criterion for that advertising item has been met.

The invention has several important technical advantages. Because the electronic publication can be ordered electronically, the consumer's order can be taken without human intervention, thus reducing the cost of ordering a publication. After ordering, the electronic publication is delivered to the consumer's electronic mail address, allowing the consumer to avoid paying dial-up service charges while reading the electronic publication. The publisher of the electronic publication also avoids the costs of printing and postage. The invention uses a consumer's phone line only for the time required to download the electronic publication from the consumer's electronic mailbox (E-mail) to his own computer. Because the consumer obtains his own copy of the electronic publication, he can read it as many times as he wants without incurring the additional costs of reading the publication on-line. The invention also allows electronic subscriptions to be created, where the consumer receives the electronic publication on a periodic basis. Renewal notices may automatically be sent to the consumer's electronic mail address, saving the costs of both printing and postage for renewal notices.

The invention allows a publisher to create a customized publication for each individual consumer. Both the articles and advertising in an electronic publication may be customized for the particular consumer that is going to read the electronic publication. Such customization may be based on a consumer profile, including both demographic data about the consumer, such as the consumer's age, sex, occupation, marital status, zip code, etc. The consumer profile may also include personal items reflecting personal data about the consumer, such as whether the consumer enjoys traveling, particular types of food, particular types of drinks, particular types of automobiles, particular types of leisure activities, etc. For specialized magazines such as magazines about a consumer's hobby, the consumer profile can be even more detailed.

By using a computer, the publisher can create a customized publication that targets advertising directly at those consumers who are most likely to respond to the advertising. This feature of the invention makes electronic publications more valuable to advertisers, as they can target their advertisements at specific consumers. In addition, the publisher can bill the advertiser based upon the number of times that the advertisement is included in an electronic publication, allowing overall advertising costs to decrease. The invention even allows a consumer to order a product or service using the electronic publication itself.

BRIEF DESCRIPTION OF THE DRAWINGS

For a more complete understanding of the present invention and the advantages thereof, reference is now made to the following descriptions taken in conjunction with the accompanying drawings in which:

FIG. 7 illustrates a flow chart for a method for generating a customized electronic publication, including customized advertising.

DETAILED DESCRIPTION OF THE INVENTION

The preferred embodiment of the present invention and its advantages are best understood by referring to FIGS. 1–7 of the drawings, like numerals being used for like and corresponding parts of the various drawings.

Figure 1:
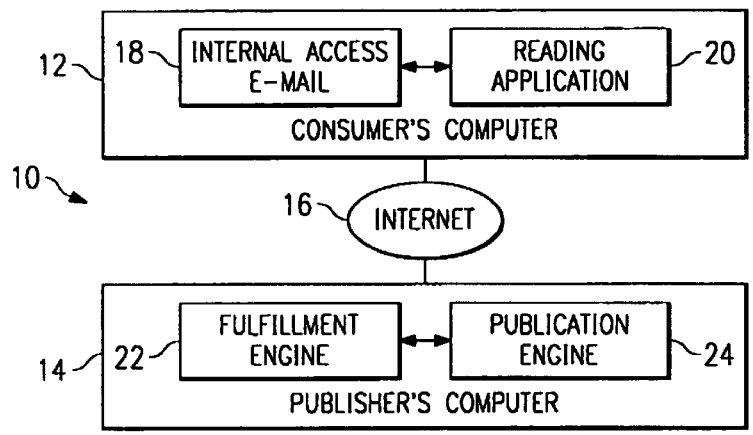
FIG. 1 illustrates a block diagram of a system for distributing an electronic publication in accordance with the teaching of the present invention.

FIG. 1 illustrates an electronic publication distribution system 10 constructed in accordance with the teachings of the invention. In this embodiment, a consumer's computer 12 is connected to a publisher's computer 14 through the Internet 16. Although the computers are connected by the Internet, a computer network or dial-up line could be used to connect consumer's computer 12 to publisher's computer 14. The invention allows electronic delivery of a publication, which may be customized, to a consumer's computer 12.

Consumer's computer 12 includes Internet access and E-Mail application 18 and reading application 20. As discussed below, Internet access and E-Mail application 18 may be used either to order an electronic publication or to receive the ordered publication, or both. Reading application 20 is used to read the electronic publication received by Internet access and E-Mail application 18.

Publisher's computer 14 is executing a fulfillment engine 22 and publication engine 24, the engines being linked together. The fulfillment engine handles the interface with consumers through the Internet, keeps track of consumer profile information, processes orders from consumers, times the delivery of electronic publications, sends renewal notices to consumers, handles billing of the consumer, obtains demographic information based upon the consumer profile, and interfaces with the publication engine. The structure and operation of fulfillment engine 22 will be described more fully below. Publication engine 24 receives a command from fulfillment engine 22 to create an electronic publication. Publication engine 24 then creates the electronic publication and returns it to fulfillment engine 22 for delivery to a consumer. The structure and operation of publication engine 24, as well as the structure and operation of electronic publication distribution system 10 will be described more fully below.

Figure 2:
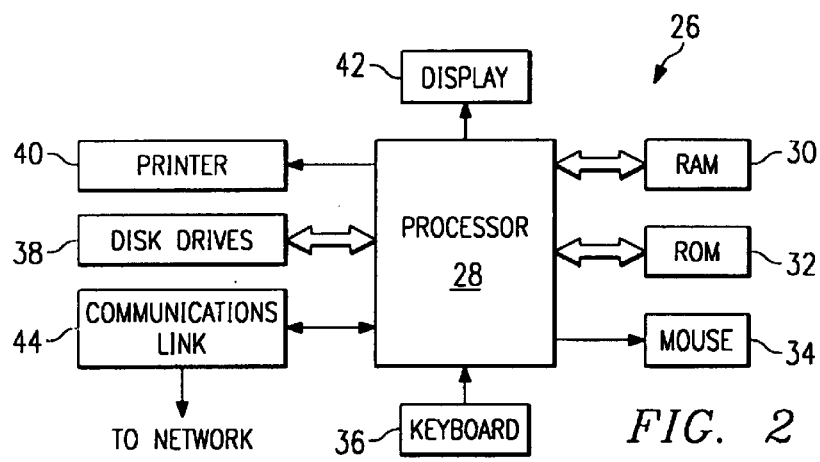
FIG. 2 illustrates a diagram of a general purpose computer that can be used in the system of FIG. 1.

FIG. 2 illustrates a general purpose computer 26 that may be used for either consumer's computer 12 or publisher's computer 14 in FIG. 1. General purpose computer 26 may be adapted to execute any of the well-known MSDOS, PCDOS, OS2, UNIX, MOTIF, MAC-OS™, X-WINDOWS, and WINDOWS™, or other operating systems. General purpose computer 26 comprises processor 28, random access memory (RAM) 30, read only memory (ROM) 32, mouse 34, keyboard 36, and input/output devices, such as printer 40, disk drives 38, display 42, and communications link 44. The present invention includes computer software that may be stored in RAM 30, ROM 32, or disk drives 38 and may be executed by processor 28. Communications link 44 is connected to the Internet 16, but could be connected to a telephone line, an antenna, a gateway, or any other type of communications link. Disk drives 38 may include a variety of types of storage media such as, for example, floppy disk drives, hard disk drives, CD ROM drives, or magnetic tape drives. Although one general purpose computer 26 has been illustrated, other types of computers could be used without departing from the scope of the invention.

Figure 3:
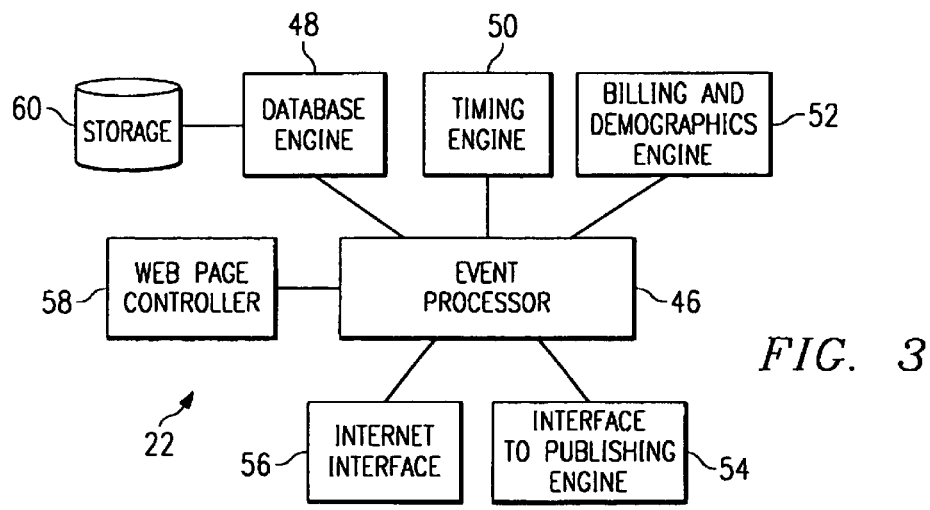
FIG. 3 illustrates a diagram of an embodiment of a fulfillment engine that can be used with the system of FIG. 1.

FIG. 3 illustrates a block diagram of an embodiment of a fulfillment engine 22 that can be used in the system of FIG. 1. Fulfillment engine 22 is controlled by an event processor 46, which receives and generates events and is connected to database engine 48, timing engine 50, billing and demographics engine 52, publishing engine interface 54, Internet interface 56, and web page controller 58. Database engine 48 is also connected to storage 60. The structure of fulfillment engine 22 may vary from the structure illustrated in FIG. 3 and various functions may be added or omitted without departing from the scope of the invention.

Fulfillment engine 22 preferably handles two main tasks: electronic publication order processing and electronic publication delivery. The operation of fulfillment engine 22 will be described more fully below. To aid in understanding the operation of the invention, however, an initial description of the function of each component of fulfillment engine 22 will now be provided.

Event processor 46 processes and generates events related to the method for distributing electronic publications. When a consumer orders an electronic publication using Internet access and E-mail application 18, event processor 46 receives an event indicating that a consumer desires to order through Internet interface 56. The consumer makes an order using an Internet web page controlled by publisher's computer 14 and accessed by the computer through Internet access and E-mail application 18. Web page controller 58 handles the control of the web page and obtains the relevant information from the consumer. The consumer profile and order information is stored in storage 60 using database engine 48. The consumer profile information and order information may be stored in the same database or in separate databases. Database engine 48 also controls databases stored on storage 60 relating to billing and demographics. Billing and demographics engine 52 handles the billing of a consumer for an order of an electronic publication. This engine also may obtain demographic information about the consumer based on other information provided by the consumer. For example, billing and demographics engine 52 may estimate the consumer's income based upon average income statistics for the consumer's zip code.

After the order has been received, event processor 46 also handles the processing of the order. Timing engine 50 is used to create an order event. If the consumer has ordered an electronic publication that is to be delivered immediately, timing engine 50 generates an event that causes immediate delivery. Otherwise, if the consumer has ordered a periodical electronic publication, timing engine 50 will create events at the appropriate time intervals when delivery of the electronic publication is proper. Timing engine 50 also will automatically generate renewal notices to the consumer when a consumer subscription to a periodical electronic publication is ready to be renewed.

Timing engine 50 generates an event that tells event processor 46 that it is time to retrieve and deliver an electronic publication to a consumer. Event processor 46 then alerts publishing engine interface 54 to cause publishing engine 24 to create an electronic publication for the consumer. Publishing engine interface 54 then generates an event received by event processor 46 when the electronic publication has been prepared by publishing engine 24. At this point, event processor 46 accesses the consumer's electronic mail address using database engine 48 and sends the publication to the consumer's electronic mail address using Internet interface 56 to access the Internet 16. The consumer downloads the electronic publication using Internet access and E-mail application 18.

Although one embodiment of a fulfillment engine 22 has been described, other embodiments could be used without departing from the scope and teachings of the invention. In addition, the functions of fulfillment engine 22 and publication engine 24 could be combined. The functions performed by fulfillment engine 22 could also be performed by a number of additional engines or processes.

Figure 4:
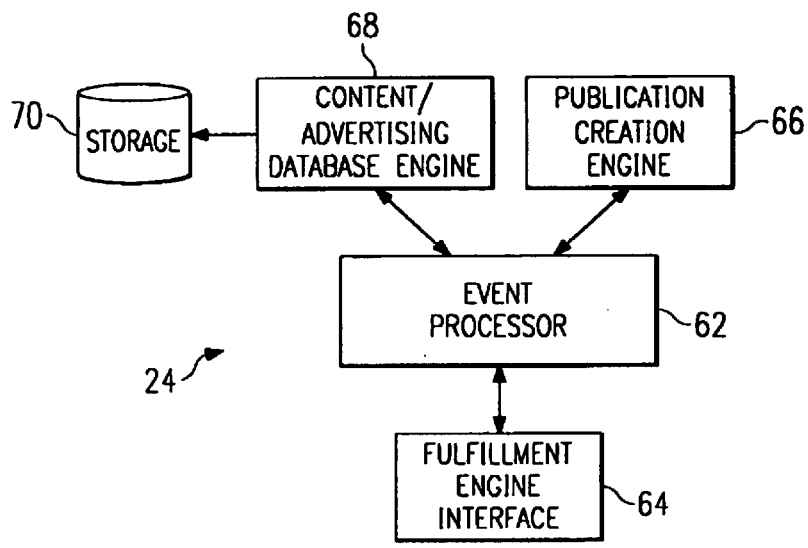
FIG. 4 illustrates a diagram of an embodiment of a publication engine that can be used with the system of FIG. 1.

FIG. 4 illustrates an embodiment of a publication engine 24 that can be used in the system of FIG. 1. Publication engine 24 comprises event processor 62, fulfillment engine interface 64, publication creation engine 66, content/advertising database engine 68, and storage 70. Event processor 62 connects to each of the engines and the interface. Content/advertising database engine 68 is connected to storage 70. Although storage 70 is separate from storage 60 in this embodiment, storage 60 and storage 70 could be combined.

Publication engine 24 is used to create a customized electronic publication for a consumer as well as to retrieve standard (uncustomized) publications for delivery to the consumer. Although the operation of publication engine 24 will be described more completely below, an overview of the function of each component will now be provided.

Event processor 62 controls publication engine 24 and receives and generates events from the components of publication engine 24 to which it is connected. Fulfillment engine interface 64 receives requests from fulfillment engine 22 to retrieve a publication or generate a customized publication. After the publication has been prepared or retrieved, fulfillment engine interface 64 returns the electronic publication to fulfillment engine 22. Publication creation engine 66 is used to create a customized electronic publication for a user. This customized publication may include customized advertising as described more fully below. Content/advertising database engine 68 is used to access content and/or advertising stored in storage 70. Content may include text, graphics, video, sound, music, etc., stored in storage 70. Similarly, the advertising stored in storage 70 may comprise text, graphics, video, sound, music, etc. Content/advertising database engine 68 is used to retrieve publications, and/or portions of publications. Publication creation engine 66 uses content/advertising database engine 68 through event processor 62 to construct a customized electronic publication.

Although one embodiment of publication engine 24 has been illustrated, other embodiments could also be used. Various functions performed by publication engine 24 could be omitted, performed by a separate process, or combined with other functions.

Figure 5:
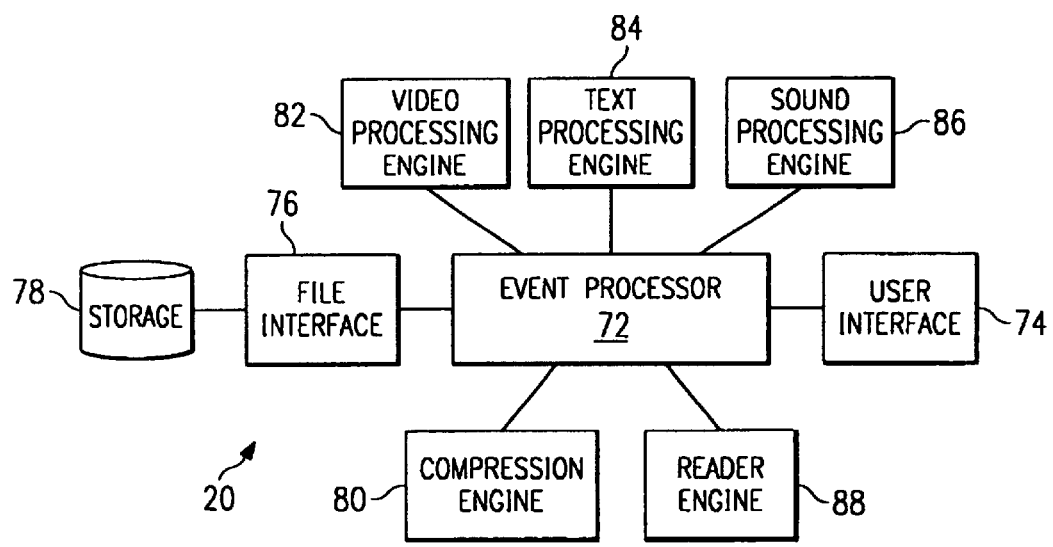
FIG. 5 illustrates a diagram of a reading application that can be used with the system of FIG. 1.

FIG. 5 illustrates an embodiment of reading application 20 that may be used in the system of FIG. 1. Reading application 20 comprises event processor 72 connected to user interface 74, file interface 76, compression engine 80, video processing engine 82, text processing engine 84, sound processing engine 86, and reader engine 88. File interface 76 is connected to storage 78.

Reading application 20 allows a consumer to read, view, listen to, interact with or otherwise use an electronic publication. Event processor 72 processes and generates events and performs all other functions required to control reading application 20. Event processor 72 may be used to control the display of advertising as described below. After the owner of consumer's computer 12 has received an electronic publication in his electronic mailbox, he may download that electronic publication to consumer's computer 12 using Internet access and E-mail application 18. The consumer may store the electronic publication in storage 78. When the consumer desires to use the electronic publication, he executes reading application 20 which accesses the stored electronic publication through file interface 76. The invention allows the publisher of the electronic publication to decide whether to allow the consumer to export portions of the electronic publication for their personal use. This control could be item by item or apply to the entire publication. Reading application 20 controls these options. This feature of the invention allows a consumer to save specific items that they particularly desire to save. The consumer could even create libraries of items related to a particular topic. This feature would also allow a consumer to save only those items of particular interest, which may save storage space.

Although this embodiment uses E-mail for delivery of electronic publications, a publication could also be downloaded directly to the consumer's computer or to a predetermined location to which the computer's processor is connected. The publication could be downloaded or sent immediately, or at a later time, depending upon the nature of the system and/or the publication.

The text and video are displayed on a display of consumer's computer 12 using user interface 74. User interface 74 is also used to send sound from the electronic publication to speakers connected to a consumer's computer 12. If desired, the publisher of the electronic publication can cause reading application 20 to generate a message from consumer's computer 12 to publisher's computer 14 indicating that a consumer has accessed the electronic publication, or even a particular item in the electronic publication such as a content item or an advertisement. This feature of the invention could be used by advertisers and publishers to monitor consumer response to advertisements or content items. Publishers might even bill for advertising based upon a consumer's viewing of the advertisement.

To reduce the size of the electronic publication for transmission to the consumer's electronic mailbox, a publisher may use compression techniques to compress the electronic publication file into a smaller file. If the publisher uses compression, compression engine 80 may be used to decompress the compressed electronic publication. In addition, a publisher may also use specialized compression techniques for text, video, and/or sound. If such compression techniques are used, decompression may be accomplished by either compression engine 80 or using video processing engine 82, text processing engine 84, and sound processing engine 86 for decompressing of video, text, and sound, respectively. Graphics may be decompressed and processed by video processing engine 82. Video processing engine 82, text processing engine 84, and sound processing engine 86 handle the processing of video, text, and sound, respectively, for output through user interface 74.

Reader engine 88 may be used to transform the text of an electronic publication into audible sound so that a consumer can command consumer's computer 12 to read the text of the electronic publication aloud to the consumer. This feature may allow a consumer to do other things such as exercise, while consumer's computer 12 reads the text of an electronic publication to the consumer. In addition, the blind may use this feature rather than purchasing braille editions of the electronic publication. Those with impaired vision may use this feature rather than purchasing large type editions of the electronic publication. Presumably, this feature will allow the blind and vision impaired to obtain a publication at less cost than a braille or large print edition.

Figure 6:
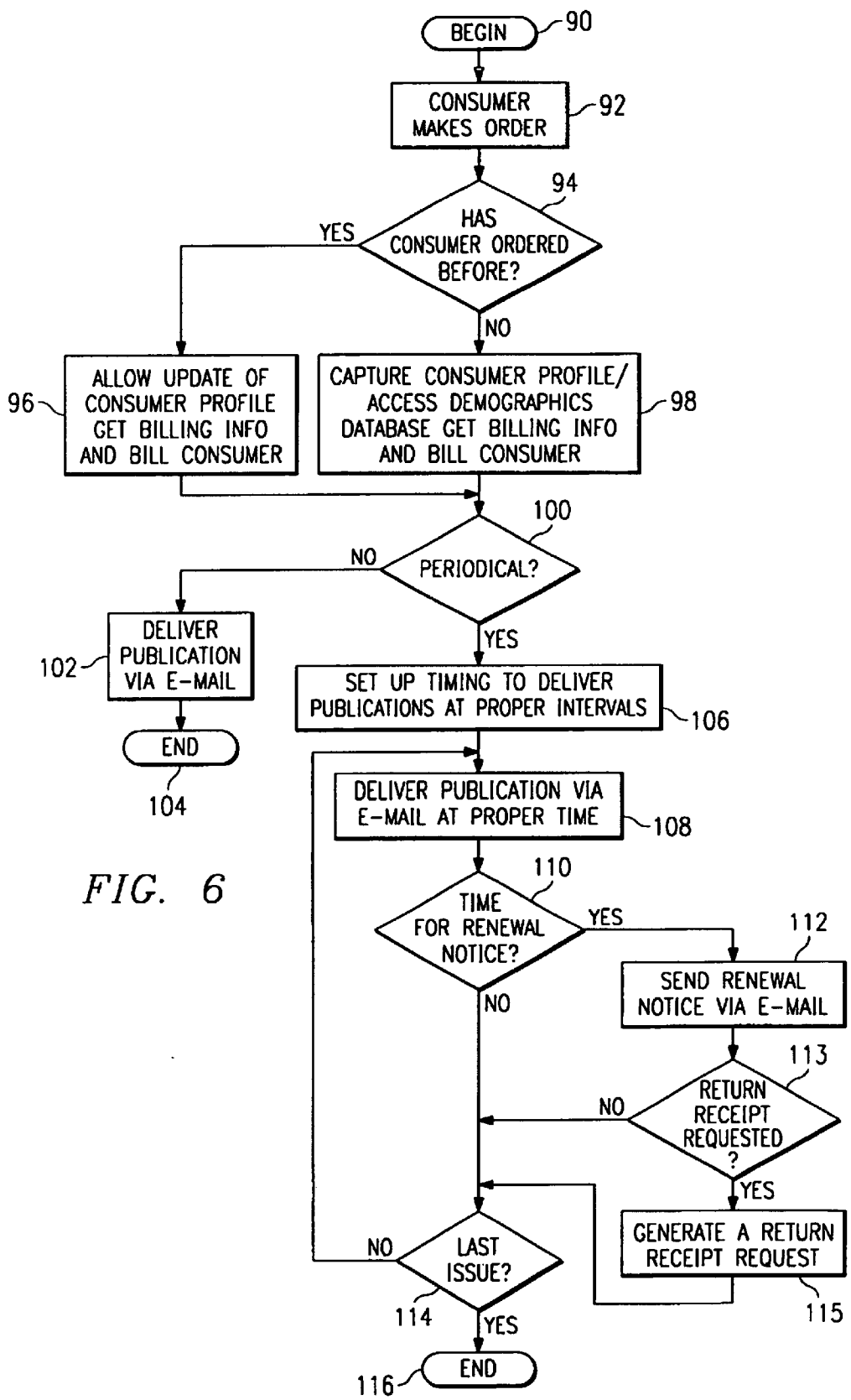
FIG. 6 illustrates a flow chart of a method for distributing an electronic publication in accordance with the invention.

FIG. 6 illustrates a flow chart of a method for distributing an electronic publication using the electronic publication distribution system 10 of FIG. 1. This figure illustrates the operation of the embodiment of the invention illustrated in FIG. 1. The method begins in step 90 as fulfillment engine 22 and publication engine 24 are initialized and awaiting an order from a consumer. In step 92, a consumer using consumer's computer 12 accesses the Internet web page controlled by publisher's computer 14 through Internet 16. Fulfillment engine 22 interacts with the consumer using the web page controlled by web page controller 58. At some point during this interaction, the consumer indicates a desire to order an electronic publication. At this point, web page controller 58 gathers some preliminary information such as the consumer's name, address and telephone number and the publication that the consumer desires to order.

Next, in step 94, web page controller 58 accesses a database of customers stored on storage 60 using database engine 48. Web page controller 58 uses this database to determine whether this particular consumer has ordered a publication before. If the consumer has ordered before, the consumer is allowed to update their consumer profile in step 96. The consumer profile is stored on storage 60 and accessed by web page controller 58 through database engine 48.

After obtaining any updates of the consumer profile, web page controller 58 obtains billing information and generates an event that is processed by event processor 46 and passed to billing and demographics engine 52 in order to generate a bill for the consumer. For example, billing and demographics engine 52 may automatically dial up a credit card company computer and perform a credit card transaction. Alternatively, billing and demographics engine 52 can generate an invoice that is delivered by the United States mail or by electronic mail to the consumer. If the consumer has updated the consumer profile, billing and demographics engine 52 may also use portions of the consumer profile to access a demographics database and update demographic information contained in the consumer profile. For example, billing and demographics engine 52 may calculate an estimate of the consumer's income based upon the zip code in which the consumer resides. Thus, the publisher could estimate the consumer's income without having to ask the consumer questions about his income. The method then continues in step 100.

If the consumer had not ordered a publication from the publisher before when the check was made in step 94, then step 98 is executed. In step 98, a consumer profile is generated based upon information provided by the consumer. The consumer profile may include both demographic items reflecting demographic data about the consumer and personal items reflecting more personal data about the consumer. Demographic data may include the consumer's age, sex, marital status, number of children, age of children, occupation, city of residence, state of residence, zip code, etc. Personal items may include the consumer's vacation preferences, food preferences, automobile preferences, hobbies, leisure activities, etc. In the case where a consumer orders an electronic publication dealing with a specific subject such as the consumer's hobby, the consumer profile may include more detailed information. Thus, even if the consumer has ordered an electronic publication before, the consumer may need to provide additional information in step 96 as to additional consumer profile items. For example, if the electronic publication is an electronic magazine about bicycling, the consumer may be asked to provide the number of bicycles owned, the maker of the bicycles, the maker of various parts on the bicycles, the bicycle accessories owned by the consumer, the most common uses that the consumer makes of a bicycle, whether the consumer takes bicycling vacations, etc. The publisher of the electronic publication may then use this consumer profile data to create a customized electronic publication for the consumer, including either customized content, customized advertising, or both.

Continuing in step 98, after obtaining the consumer profile information, billing information is obtained and the consumer is billed using billing and demographics engine 52 as was described for step 96. In addition, the demographics database is accessed and consumer profile updated as was done in step 96.

Next, in step 100, it is determined whether the consumer has ordered a periodical or not. In the case where the consumer has not ordered a periodical, the consumer has likely ordered an electronic book, video, or sound recording. The particular item ordered by the consumer is delivered to the consumer in step 102 using the consumer's electronic mail address. The publication may optionally be sent return receipt requested to provide the publisher with electronic verification that the publication has indeed been delivered to or received by the consumer. Delivery is accomplished through an event generated by web page controller 58 to event processor 46. Event processor 46 processes the event and generates a request to publishing engine 24 through publishing engine interface 54 to retrieve the electronic publication ordered by the consumer. After publication engine 24 retrieves the appropriate electronic publication through content/advertising database engine 68, it returns the electronic publication to fulfillment engine 22 through fulfillment engine interface 64. Fulfillment engine 22 receives the electronic publication through publishing engine interface 54 and sends the electronic publication to the consumer's electronic mail address using Internet interface 56. Event processor 46 may also generate an event to cause database engine 48 to make a record that the electronic publication was delivered to the consumer. Alternatively, a return receipt may be requested. The electronic publication may be sent with such a request and the receipt notice is received by event processor 46 through Internet interface 56. The receipt may be stored in storage 60 using database engine 48. The procedure then terminates in step 104.

If, however, the consumer has ordered a periodical electronic publication, web page controller 58 generates an event that event processor 46 passes to timing engine 50. In step 106, timing engine 50 sets up a timing mechanism to cause delivery of the electronic publication at the proper intervals to the consumer. For example, if the consumer has ordered a monthly publication, timing engine 50 will cause events to be generated each month when the electronic publication is ready for delivery. These events will cause event processor 46 to retrieve the publication from publication engine 24 and send the publication to the consumer using the consumer's electronic mail address. The particular periodical electronic publication sent to the user may or may not be a customized electronic publication.

Timing engine 50 generates an event for event processor 46 at the appropriate time in step 108 and causes the publication to be delivered by electronic mail. Timing engine 50, upon delivery of an electronic publication, also determines whether it is time to send a renewal notice to the consumer because the consumer's subscription to the electronic publication either has lapsed or is about to lapse. If it is time for a renewal notice to be sent, timing engine 50 causes that notice to be sent to the consumer's electronic mail address in step 112. The message is sent using Internet interface 56. The message may optionally be sent return receipt requested to provide the publisher with electronic verification of receipt. At step 113, if a return receipt is requested, then in step 115, a return receipt request is generated. The procedure continues in step 114 if no return receipt was requested in step 113 or after generation of a return receipt in step 115. Timing engine 50, in step 114, determines whether the periodical is the last issue in the consumer subscription. If not, timing engine 50 sets up another event and subsequently delivers the next issue of the electronic publication in step 108. If the issue is the last issue in the consumer subscription, timing engine 50 disables any further delivery to the consumer and the process terminates at step 116.

Although this aspect of the invention has been described with respect to the embodiment illustrated in FIG. 1 and the method illustrated in FIG. 6, various alternatives may be used without departing from the scope of the invention. For example, the delivery methods of the invention may be used whether the consumer's order is obtained electronically as in the illustrated embodiment, or by a human operator over the telephone. Also, the electronic publication delivered to the consumer may be any type of electronic publication such as an electronic magazine, a multimedia publication, a video, a sound recording, etc. The electronic publication may or may not be customized for a particular consumer. In the case of a customized publication, either the content, the advertising, or both may be customized for the consumer based upon the consumer profile.

FIG. 7 illustrates a flow chart of a method that can be used to create a customized electronic publication for a particular consumer. In this embodiment, the advertising in the electronic publication is customized for the consumer. Alternatively, the content of the electronic publication could also be customized using a similar method without departing from the scope of the invention.

The procedure begins in step 118 as the publication engine 24 is initialized and awaits requests from fulfillment engine 22 to prepare a customized electronic publication. In step 120, publication engine 24 receives a request from fulfillment engine 22 to prepare a publication for a particular consumer. In step 122, the consumer profile information for that consumer is retrieved. The consumer profile information may either be retrieved through a request from publication engine 24 to fulfillment engine 22 or by publication engine 24 directly. Alternatively, fulfillment engine 22 may pass the consumer profile information to publication 24, along with the request to prepare a publication for that consumer.

Then, in step 124, publication engine 24 assembles the content items for the electronic publication. Publication creation engine 66 retrieves these items from storage 70 using content/advertising database engine 68. The retrieved content items may be temporarily stored in another location in storage 70 or in memory of publisher's computer 14. Next, in step 126, the process of putting advertising items into the electronic publication begins. Publication creation engine 66 retrieves an advertising item inclusion criterion from a database stored in storage 70. The advertising item inclusion criterion contains a series of conditions tied to profile data items in a consumer profile. If all of the conditions in the inclusion criterion are met, then the advertising item will be included in the electronic publication.

For some advertising items, the advertising item inclusion criterion will be met for all copies of the electronic publication. In other words, the advertisement will be included in the electronic publication, regardless of the consumer profile. Certain advertisers may wish all subscribers to an electronic publication to receive an advertisement rather than targeting the advertisement towards particular consumers. A publisher may charge a different rate for including such an advertisement in an electronic publication.

In step 128, it is determined whether the advertisement is a targeted advertisement or not. If not, then the item is included in the electronic publication in step 136. If the advertising item under consideration is a targeted advertising item, then, in step 130, it is determined whether the inclusion criterion for that advertising item has been met. If not, the item is rejected in step 138 and the procedure continues in step 134. If the inclusion criterion has been met, then, in step 132, it is determined whether the maximum advertising allowed for an electronic publication has been reached.

A publisher may desire to limit the total amount of advertising that may be included in a particular electronic publication. Consumers may be dissatisfied if the total amount of advertising grows too large. Because many of the advertising items included in an electronic publication may be targeted advertising items, a publisher may have a difficult time determining exactly how much advertising information will be included within a particular consumer's electronic publication. Accordingly, this embodiment of the invention checks to see whether a maximum amount of advertising has already been included in the electronic publication. If so, then the item is rejected in step 138. If not, then the item is included in the electronic publication in step 136. Because a publisher may control the order in which publication engine 24 processes targeted advertising items, a publisher may charge a different rate to an advertiser depending upon where that advertiser's advertisement is processed in the list. Those advertisements processed towards the top of the list could command a higher price than those processed towards the bottom of the list.

After step 136 or step 138, it is determined in step 134 whether there are more advertising items in the advertising item database to be processed. If not, then the customized electronic publication is completed and delivered to the fulfillment engine in step 140 and the process terminates in step 142. If there are more items to process, then the procedure continues at step 126 with the retrieval of the next advertising item inclusion criterion.

It should be noted that there are various options for how advertising items are presented to a consumer who is using the customized electronic publication. A publisher may desire to give the user the option to suppress certain advertising. If the advertising is suppressible, the publisher may charge an advertiser a lower fee for inclusion of the advertising in an electronic publication. Thus, advertising could be globally suppressible or suppressible on an item-by-item basis.

The advertising may appear on "pages" of the electronic publication if the electronic publication comprises primarily textual information and still-photos or graphics. Passing a pointer over portions of the advertisement could trigger the presentation of a multimedia item. Also, reading application 20 could cause an advertisement to appear after the electronic publication has been in use for a predetermined amount of time. For example, reading application 20 might cause advertising to appear every 15 minutes. Data could be retained by reading application 20 such that advertising timing carries over to the next time that the consumer uses the electronic publication. For example, if the consumer uses the publication for only 10 minutes, then an advertisement may be displayed after only 5 minutes of use when the consumer next uses the publication. This feature would prevent a consumer from trying to avoid viewing advertising by terminating reading application 20 each time an advertisement was about to be displayed.

Advertising items might also be linked to specific content items and displayed upon the access of a particular content item by a consumer. Similarly, advertising might appear when a consumer accesses a particular piece of information within a content item. Other methods of triggering the advertising items to be output to users of the electronic publication could be used without departing from the scope of the invention. Event processor 72 controls the presentation of advertising to a consumer in this embodiment.

The invention also provides an additional benefit to advertisers. Reading application 20 allows an advertiser to design an advertisement such that the consumer can input information indicating either that he desires to obtain more information about a product or service or that he desires to order a product or service. A request for more information causes additional information to be output to the consumer from the reading application 20. If the consumer desires to order a product or service, reading application 20 can automatically dial up a computerized order processing service for the product or service or send an electronic mail message to the advertiser such that the electronic mail message orders the product or service automatically. This feature of the invention provides additional benefits to the advertiser and makes purchasing products and services easier for a consumer.

The invention may also be used to increase sales of other publications sold by the publisher. For example, fulfillment engine 22 may give a consumer the option to purchase back issues of the electronic publication. Also, based upon the consumer profile input by the consumer, fulfillment engine 22 may offer the consumer additional electronic publications based upon one or more profile data items in the consumer profile.

The distribution system of the invention could also be used to distribute updated versions of reading application 20 to consumers. To accomplish this feature, fulfillment engine 22 may deliver the updated version of reading application 20 to the consumer's electronic mail address on the Internet 16. The consumer would then download the new version of the reading application 20 to the consumer's computer 12 and replace the old version of reading application 20.

Although the present invention has been described in detail, it should be understood that various changes, substitutions, and alterations can be made hereto without departing from the spirit and scope of the invention as defined by the appended claims.

What is claimed is:

1. A system for distributing an electronic publication, comprising:

a computer network;

a consumer computer coupled to the computer network and associated with a consumer;

a publisher computer which is coupled to the computer network and which is operable to retrieve an electronic publication, and to deliver the electronic publication to the consumer by electronically sending the electronic publication to the consumer's electronic mail address;

an operator interface portion operable to present the electronic publication to the consumer; and an application running on the consumer computer, the application being operable to control the export of items from the electronic publication by the consumer.

2. The system of claim 1, wherein the publisher computer is operative to designate each of the items of the electronic publication as one of exportable or non-exportable, and wherein the application running on the consumer computer is operable to permit the export of items which are designated as exportable, and to prevent the export of items which are designated as non-exportable.

\* \* \* \* \*